US012461476B2

(12) United States Patent
Mizuguchi

(10) Patent No.: US 12,461,476 B2
(45) Date of Patent: Nov. 4, 2025

(54) SHEET CONVEYANCE DEVICE AND IMAGE FORMING APPARATUS PROVIDED THEREWITH

(71) Applicant: KYOCERA Document Solutions Inc., Osaka (JP)

(72) Inventor: Keisuke Mizuguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/849,102

(22) PCT Filed: Mar. 22, 2023

(86) PCT No.: PCT/JP2023/011149
§ 371 (c)(1),
(2) Date: Sep. 20, 2024

(87) PCT Pub. No.: WO2023/189915
PCT Pub. Date: Oct. 5, 2023

(65) Prior Publication Data

US 2025/0199447 A1 Jun. 19, 2025

(30) Foreign Application Priority Data

Mar. 30, 2022 (JP) ................................ 2022-055000

(51) Int. Cl.
*G03G 15/00* (2006.01)

(52) U.S. Cl.
CPC .................... *G03G 15/6511* (2013.01); *G03G 2215/00565* (2013.01); *G03G 2215/00679* (2013.01); *G03G 2215/00725* (2013.01)

(58) Field of Classification Search
None
See application file for complete search history.

(56) References Cited

U.S. PATENT DOCUMENTS

2006/0188305 A1* 8/2006 Murrell .............. G03G 15/6564 399/388
2016/0355358 A1* 12/2016 Murakami ............... B65H 7/00

FOREIGN PATENT DOCUMENTS

JP 2008-222417 A 9/2008

* cited by examiner

*Primary Examiner* — Leslie J Evanisko
(74) *Attorney, Agent, or Firm* — Stein IP, LLC

(57) ABSTRACT

A sheet conveyance device includes a sheet conveyance passage, a first sheet stacking portion, a first feeding portion, a second feeding portion, a sheet detection mechanism, a driving portion, and a control portion. The first sheet stacking portion has a bottom face part and a lifting plate. The driving portion drives the first feeding portion when rotating forward and drives the second feeding portion when rotating reversely. The sheet detection mechanism has an actuator and a detection sensor. The control portion controls such that, for a sheet fed from the first sheet stacking portion, when the sheet is detected by the sheet detection mechanism, the driving portion rotates forward and, for a sheet conveyed from the second feeding portion, the driving portion rotates reversely and, when the detection sensor detects the actuator swinging at the detection position, the driving portion is switched to rotate forward.

9 Claims, 8 Drawing Sheets

SHEET CONVEYANCE DEVICE AND IMAGE FORMING APPARATUS PROVIDED THEREWITH

CROSS-REFERENCE TO RELATED APPLICATIONS

This application is a national stage of International Application No. PCT/JP2023/011149, filed on Mar. 22, 2023, which claims the benefit of Japanese Application No. 2022-055000, filed on Mar. 30, 2022, in the Japanese Patent Office, the disclosures of which are incorporated herein by reference.

TECHNICAL FIELD

The present invention relates to a sheet conveyance device and to an image forming apparatus including a sheet conveyance device.

BACKGROUND ART

Some known sheet conveyance devices for incorporation in image forming apparatuses that allow what is called manual feed printing include two feeding portions (a first feeding portion and a second feeding portion) (see, Patent Document 1). The first feeding portion has a first sheet stacking portion that is removably mounted in an image forming apparatus. The second feeding portion has a second stacking portion provided in a side part of the image forming apparatus. The first sheet stacking portion stores sheets of various standard sizes of printing paper or the like. The second sheet stacking portion stores, in addition to printing paper of standard sizes, sheets of nonstandard sizes of printing paper, OHP sheets, envelopes, and the like. When manual feed printing is performed, sheets are fed from the second sheet stacking portion.

The sheet conveyance apparatus described above includes, in addition to the two feeding portions described above, a sheet conveyance passage, a first detection sensor, and a second detection sensor. The sheet conveyance passage conveys a sheet to an image forming portion in the image forming apparatus. The first feeding portion feeds the sheet from the first sheet stacking portion along the sheet conveyance passage. The sheet feeding portion feeds the sheet from the second sheet stacking portion to the first feeding portion.

The first detection sensor can detect whether a sheet is stacked on the first sheet stacking portion. The second detection sensor can detect whether a sheet stacked on the second sheet stacking portion has been conveyed to the sheet conveyance passage. The image forming apparatus described above can, based on the result of detection by the second detection sensor, detect the timing of the conveyance of the sheet from the second feeding portion.

CITATION LIST

Patent Literature

Patent Document 1: Japanese Unexamined Patent Application Publication No. 2008-222417

SUMMARY OF INVENTION

Technical Problem

Inconveniently, arranging a plurality of detection sensors as in the sheet conveyance device of Patent Document 1 may lead to an increase in the number of components and a complicated control system, inviting an increase in manufacturing cost. An object of the present invention is to provide a sheet conveyance device that can suppress an increase in manufacturing cost and that can detect a sheet fed from a second feeding portion, and to provide an image forming apparatus including such a sheet conveyance device.

Solution to Problem

In order to achieve the above object, according to a first configuration of the present invention, a sheet conveyance device includes a sheet conveyance passage, a first sheet stacking portion, a first feeding portion, a second feeding portion, a sheet detection mechanism, a driving portion, and a control portion. The sheet conveyance passage is provided in an apparatus main body to convey a sheet. The first sheet stacking portion is arranged inside the apparatus main body. The first sheet stacking portion has a bottom face part on which the sheet is stacked and a lifting plate that is provided so as to be movable up and down with respect to the bottom face part and that moves the sheet on the bottom face part up and down to arrange the sheet at a feeding position. The first feeding portion feeds the sheet stacked on the first sheet stacking portion to the sheet conveyance passage. The second feeding portion feeds the sheet fed from a side part of the apparatus main body to the first feeding portion. The sheet detection mechanism is provided in the first feeding portion and can detect whether the sheet is stacked on the first sheet stacking portion. The driving portion can switch its rotation direction. The driving portion, when rotating forward, drives the first feeding portion and, when rotating reversely, drives the second feeding portion. The control portion controls the conveyance of the sheet. The sheet detection mechanism has an actuator that can swing along the sheet conveyance direction while in contact with the sheet stacked on the first sheet stacking portion or the sheet conveyed by the second feeding portion, and a detection sensor that detects the actuator at a predetermined detection position. The control portion controls such that, for a sheet fed from the first sheet stacking portion, when the sheet is detected by the sheet detection mechanism, the driving portion rotates forward so that the first feeding portion feeds the sheet. The control portion controls such that, for a sheet conveyed from the second feeding portion, the driving portion rotates reversely so that the sheet is conveyed to the first feeding portion by the second feeding portion and, when the detection sensor detects at the detection position the actuator swinging by making contact with the sheet conveyed from the second feeding portion, the driving portion is switched to rotate forward so that the first feeding portion feeds the sheet.

Advantageous Effects of Invention

According to the first configuration of the present invention, by detecting the swinging of the actuator with one detection sensor, it is possible to check whether sheets are stacked on the first sheet stacking portion and whether a sheet is fed from the second feeding portion. This helps reduce the number of sensors while detecting a sheet fed from the second feeding portion. It is thus possible to provide a sheet conveyance device that can detect a sheet fed from the second feeding portion while suppressing an increase in manufacturing cost.

DESCRIPTION OF EMBODIMENTS

Figure 1:
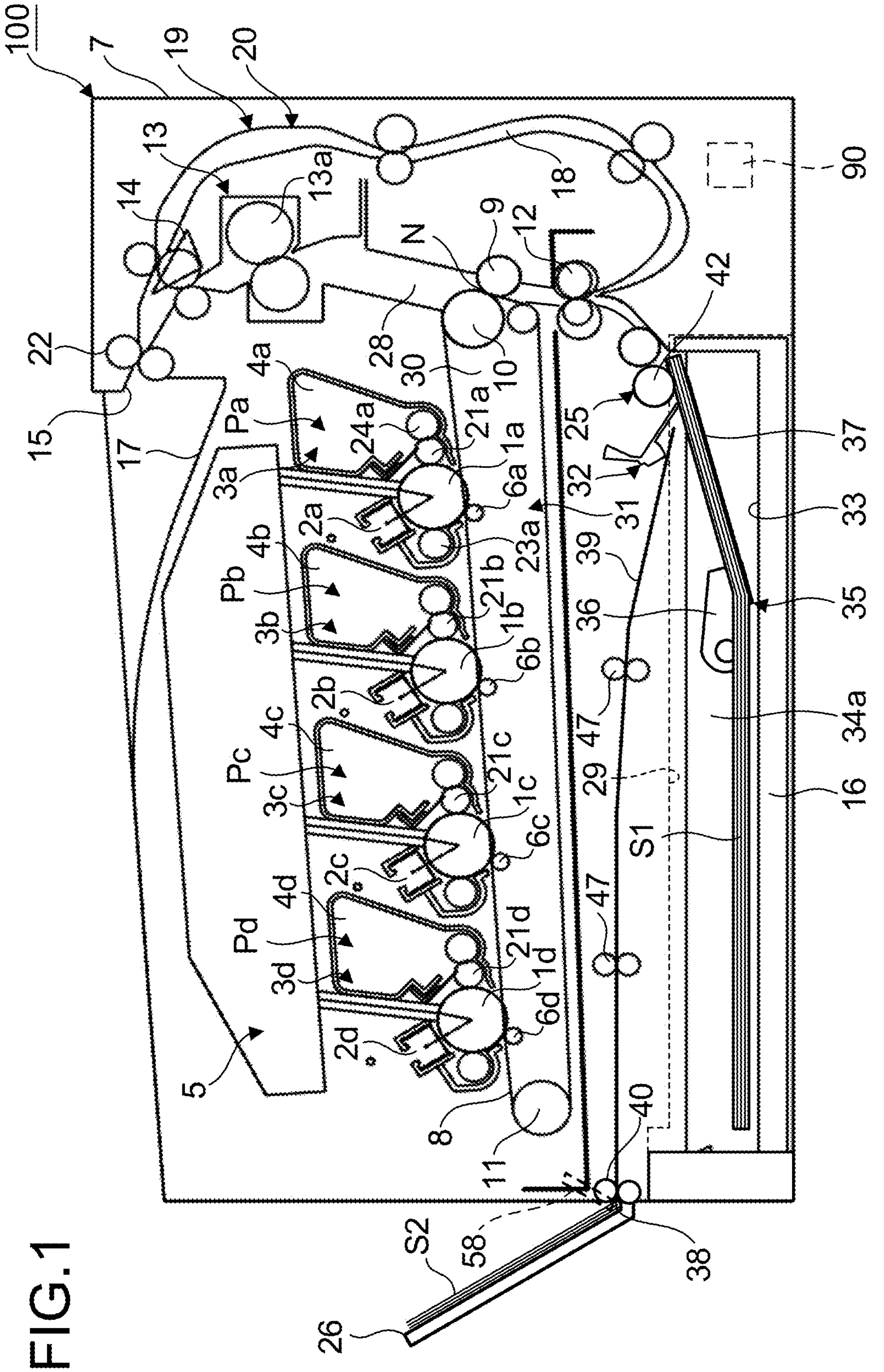
FIG. 1 is a schematic sectional view of an image forming apparatus 100 incorporating a sheet conveyance device 19 according to a first embodiment of the present invention.

Hereinafter, a first embodiment of the present invention will be described with reference to the drawings. FIG. 1 is a schematic sectional view of an image forming apparatus 100 incorporating a sheet conveyance device 19 according to a first embodiment of the present invention. The image forming apparatus 100 shown in FIG. 1 is what is called a tandem-type color printer.

In a main body (hereinafter, referred to as apparatus main body 7) of the image forming apparatus 100, four image forming portions Pa to Pd are arranged one beside the next in the horizontal direction. The image forming portions Pa to Pd sequentially form magenta, cyan, yellow, and black images, each through processes of electrostatic charging, exposure to light, image development, and image transfer. The image forming portions Pa to Pd are provided so as to correspond to images of the different colors. Only the image forming portion Pa will be described below and, since the image forming portions Pb to Pd have basically a similar structure, no description will be repeated.

In the image forming portion Pa is arranged a photosensitive drum 1*a*, which carries a visible image (toner image). Above the image forming portion Pa, an exposure device 5 is arranged. The exposure device 5 irradiates the surfaces of the photosensitive drums 1*a* to 1*d* with a light beam to form on them electrostatic latent images. Around the photosensitive drum 1*a*, there are provided a charging device 2*a*, a development device 3*a*, and a rubbing roller 23*a* along the drum rotation direction (clockwise in FIG. 1).

The charging device 2*a* is arranged to face the photosensitive drum 1*a* and electrostatically charges the surface of the photosensitive drum 1*a*. The development device 3*a* has a development container 4*a*, a development roller 21*a*, and a feeding roller 24*a*. The development container 4*a* is loaded with a predetermined amount of toner. The development containers 4*a* to 4*d* are loaded with toner of magenta, cyan, yellow, and black for the development devices 3*a* to 3*d* respectively.

The development roller 21*a* is arranged to face the photosensitive drum 1*a*. The feeding roller 24*a* feeds the toner in the development container 4*a* to the outer circumferential surface of the development roller 21*a*. The development roller 21*a* can feed toner fed to its outer circumferential surface to the photosensitive drum 1*a*.

Below the photosensitive drums 1*a* to 1*d*, an intermediate transfer unit 31 is provided. The intermediate transfer unit 31 includes a frame 30, a driving roller 10, a tension roller 11, an intermediate transfer belt 8, and primary transfer rollers 6*a* to 6*d*.

The frame 30 extends along the width direction (left-right direction shown in FIG. 1) of the image forming apparatus 100. The driving roller 10 and the tension roller 11 are rotatably supported at the opposite ends of the frame 30 in the longitudinal direction.

The intermediate transfer belt 8 is an endless belt (preferably a seamless belt without seams). The intermediate transfer belt 8 is wound around from the tension roller 11 to the driving roller 10 so as to be rotatable in the circumferential direction.

The driving roller 10 is connected to a belt driving motor (not illustrated). As the driving roller 10 rotates with a rotative driving force from the belt driving motor, the rotative driving force is transmitted to the intermediate transfer belt 8 by a frictional force. Thus, the intermediate transfer belt 8 rotates in the same direction as the rotation direction of the driving roller 10.

The primary transfer rollers 6*a* to 6*d* are rotatably and movably supported on the frame 30 at a position at which they face the photosensitive drums 1*a* to 1*d* across the intermediate transfer belt 8.

So as to face the driving roller 10 across the intermediate transfer belt 8, a secondary transfer roller 9 is provided. The secondary transfer roller 9 is kept in pressed contact with the intermediate transfer belt 8 to form a secondary transfer nip N. The secondary transfer roller 9 secondarily transfers the toner image formed on the intermediate transfer belt 8 to a sheet S1 or S2 passing through the secondary transfer nip N.

In the image forming apparatus 100, at a position to the side of the image forming portions Pa to Pd and the intermediate transfer belt 8, a sheet conveyance device 19 is provided. The sheet conveyance device 19 includes a sheet conveyance passage 20, a pair of registration rollers 12, a sheet cassette 16 (first sheet stacking portion), a sheet feeding portion 25 (first feeding portion), an MPF (multi paper feeder) tray 26 (second sheet stacking portion), a moving mechanism 27, and a sheet detection mechanism 32. The sheet conveyance device 19 also includes a control portion 90. The control portion 90 can be provided anywhere inside the image forming apparatus 100 or inside the sheet conveyance device 19.

The sheet conveyance passage 20 is configured to include a main conveyance passage 28 and a duplex conveyance passage 18. The main conveyance passage 28 extends in the up-down direction. Halfway along the main conveyance passage 28, the pair of registration rollers 12, the secondary transfer roller 9, and a fixing device 13 are arranged. The main conveyance passage 28 conveys the sheet S1 or S2 such that these pass from the MPF tray 26 and the sheet cassette 16, which will be described later, through the pair of registration rollers 12, the secondary transfer nip N, and the fixing device 13 in this order.

The pair of registration rollers 12 align the conveyance direction of the sheet S1 or S2 so that the leading end (the downstream end with respect to the sheet conveyance direction) of the sheet S1 or S2 is orthogonal to the sheet conveyance direction and thereby correct skewed conveying (a skew).

At the downstream end of the main conveyance passage 28 with respect to the sheet conveyance direction, a sheet discharging port 15 is provided that leads to outside the image forming apparatus 100. The sheet discharging port 15 is provided with a pair of discharge rollers 22. The pair of discharge rollers 22 discharges the sheet S1 or S2 that has reached the sheet discharging port 15 to a discharge tray 17 formed in the top face of the main body of the image forming apparatus 100.

Between the pair of discharge rollers 22 and the fixing device 13 with respect to the sheet conveyance direction, a branch portion 14 is provided. The duplex conveyance passage 18 branches from the main conveyance passage 28 at a position where the duplex conveyance passage 18 overlaps with the branch portion 14 in the main conveyance passage 28 with respect to the sheet conveyance passage and joins the main conveyance passage 28 at a position upstream of the pair of registration rollers 12. The branch portion 14 can distribute the sheet S1 or S2 having passed through the fixing device 13 to the sheet discharging port 15 or to the duplex conveyance passage 18.

The sheet cassette 16 and the MPF tray 26 are provided upstream of the main conveyance passage 28 with respect to the sheet conveyance direction. The sheet cassette 16 can be stacked with sheets S1 and the MPF tray 26 can be stacked with sheets S2. The sheet feeding portion 25 is arranged between the sheet cassette 16 and the MPF tray 26 and feeds the sheets S1 and S2 to the main conveyance passage 28. The feeding of the sheets S1 and S2 will be described in detail later.

Next, the image forming procedure in the image forming apparatus 100 will be described. When the user enters a command to start image formation, first, the photosensitive drum 1*a* is rotated and the charging devices 2*a* to 2*d* electrostatically charge the surfaces of the photosensitive drums 1*a* to 1*d* uniformly. Next, the exposure device 5 irradiates the surfaces of the photosensitive drums 1*a* to 1*d* with light to form on them electrostatic latent images according to an image signal.

Then, the toner in the developer in the development devices 3*a* to 3*d* is fed by the development rollers 21*a* to 21*d* to the photosensitive drums 1*a* to 1*d* and electrostatically adheres to them. Thus, toner images are formed on the photosensitive drums 1*a* to 1*d* according to the electrostatic latent images.

In this state, the driving roller 10 is rotated and the intermediate transfer belt 8 is started to rotate counterclockwise. Then the toner images of different colors formed on the photosensitive drums 1*a* to 1*d* are primarily transferred sequentially to the intermediate transfer belt 8.

After that, with predetermined timing, a sheet S1 or S2 is fed out from the sheet cassette 16 or the MPF tray 26 to the main conveyance passage 28, passes through the pair of registration rollers 12, and is conveyed to the secondary transfer nip N. Then the toner images on the intermediate transfer belt 8 are secondarily transferred to the sheet S1 or S2. Next the sheet S1 or S2 is conveyed to the fixing device 13 and the toner images are fixed to the surface of the sheet S1 or S2 by being heated and pressed with a pair of fixing rollers 13*a* in the fixing portion 13.

Here, when simplex printing is performed on the sheet S1 or S2, the branch portion 14 distributes the sheet S1 or S2 having passed through the fixing device 13 to the sheet discharging port 15. The sheet S1 or S2 that has reached the sheet discharging port 15 is discharged on the discharge tray 17 with the pair of discharge rollers 22.

When duplex printing is performed on the sheet S1 or S2, the branch portion 14 distributes the sheet S1 or S2 having passed through the fixing device 13 to the duplex conveyance passage 18. The duplex conveyance passage 18, while reversing the sheet S1 or S2 top side down, conveys it again to the pair of registration rollers 12. Then the sheet S1 or S2 passes through the secondary transfer nip N and the fixing device 13 again and, after the toner images are fixed on its reverse side, the sheet S1 or S2 is distributed to the sheet discharging port 15 by the branch portion 14.

Figure 2:
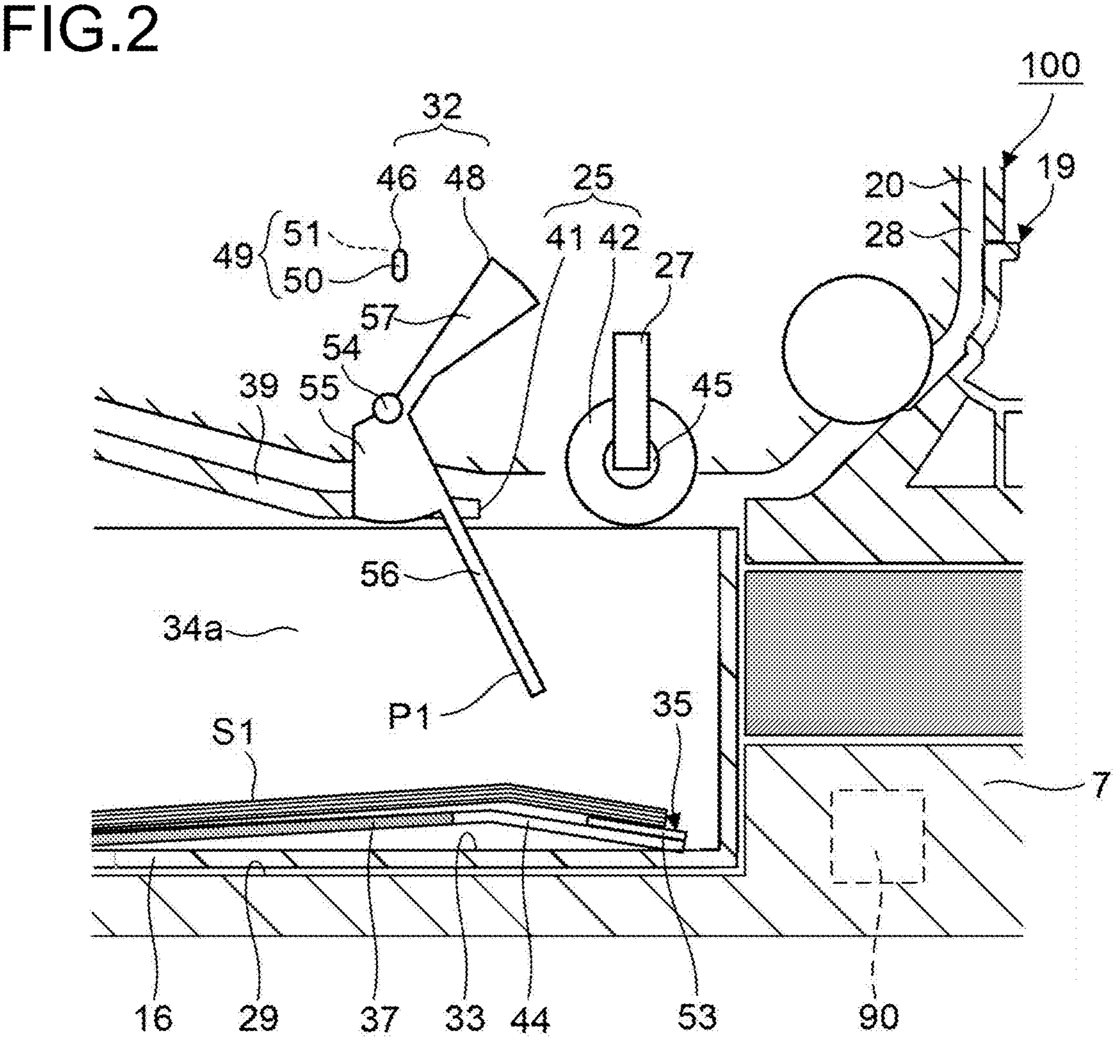
FIG. 2 is an enlarged side sectional view around a bottom part of an apparatus main body 7 in FIG. 1.
Figure 3:
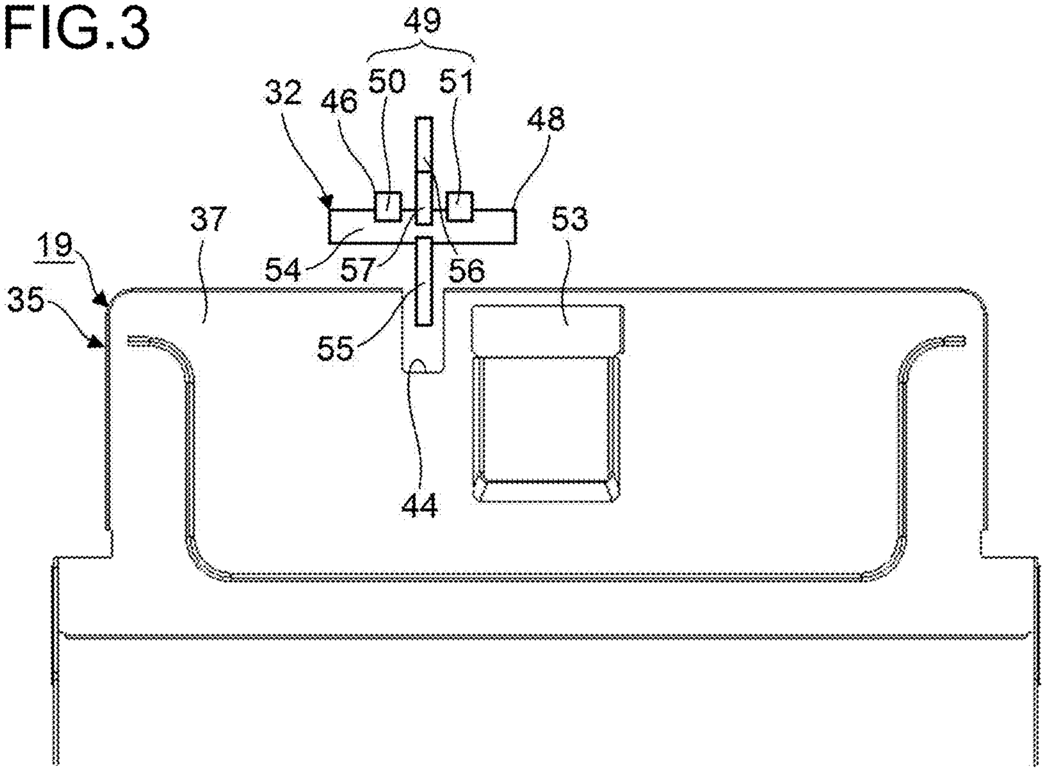
FIG. 3 is a plan view, as seen from above, of a stacking plate 37 and a sheet detection mechanism 32.

Next, the feeding of the sheet S1 or S2 will be described in detail. FIG. 2 is an enlarged side sectional view around a bottom part of the apparatus main body 7 in FIG. 1. FIG. 3 is a plan view, as seen from above, of a stacking plate 37 and the sheet detection mechanism 32. As shown in FIGS. 1 and 2, in the bottom part of the apparatus main body 7, a cassette accommodation portion 29 recessed in the horizontal direction is formed. The cassette accommodation portion 29 is a recessed portion that is open (not shown) in a side part of the apparatus main body 7 and that extends from the edge of the opening to inside the apparatus main body 7 in the horizontal direction.

In the cassette accommodation portion 29, the sheet cassette 16 is accommodated. The sheet cassette 16 is inserted through the opening in the side part of the apparatus main body 7 into the cassette accommodation portion 29. The sheet cassette 16 is removably mounted in the apparatus main body 7.

The sheet cassette 16 has a bottom face part 33, a pair of first side wall portion 34*a*, and a lift plate 35. The bottom face part 33 is a rectangular plate extending in the horizontal direction and constitutes a bottom part of the sheet cassette 16. On the bottom face part 33, sheets S1 (sheets as a recording medium, such as printing sheets, envelopes, OHP sheets, and the like) are stacked.

The pair of first side wall portion 34*a* is provided such that each connects to one of opposite ends of the bottom face part 33 in the sheet width direction (the direction orthogonal to the sheet conveyance direction, that is, the direction perpendicular to the plane of FIG. 2). The pair of first side wall portion 34*a* rises upward (toward the image forming portions Pa to Pb) from the bottom face part 33.

Figure 7:
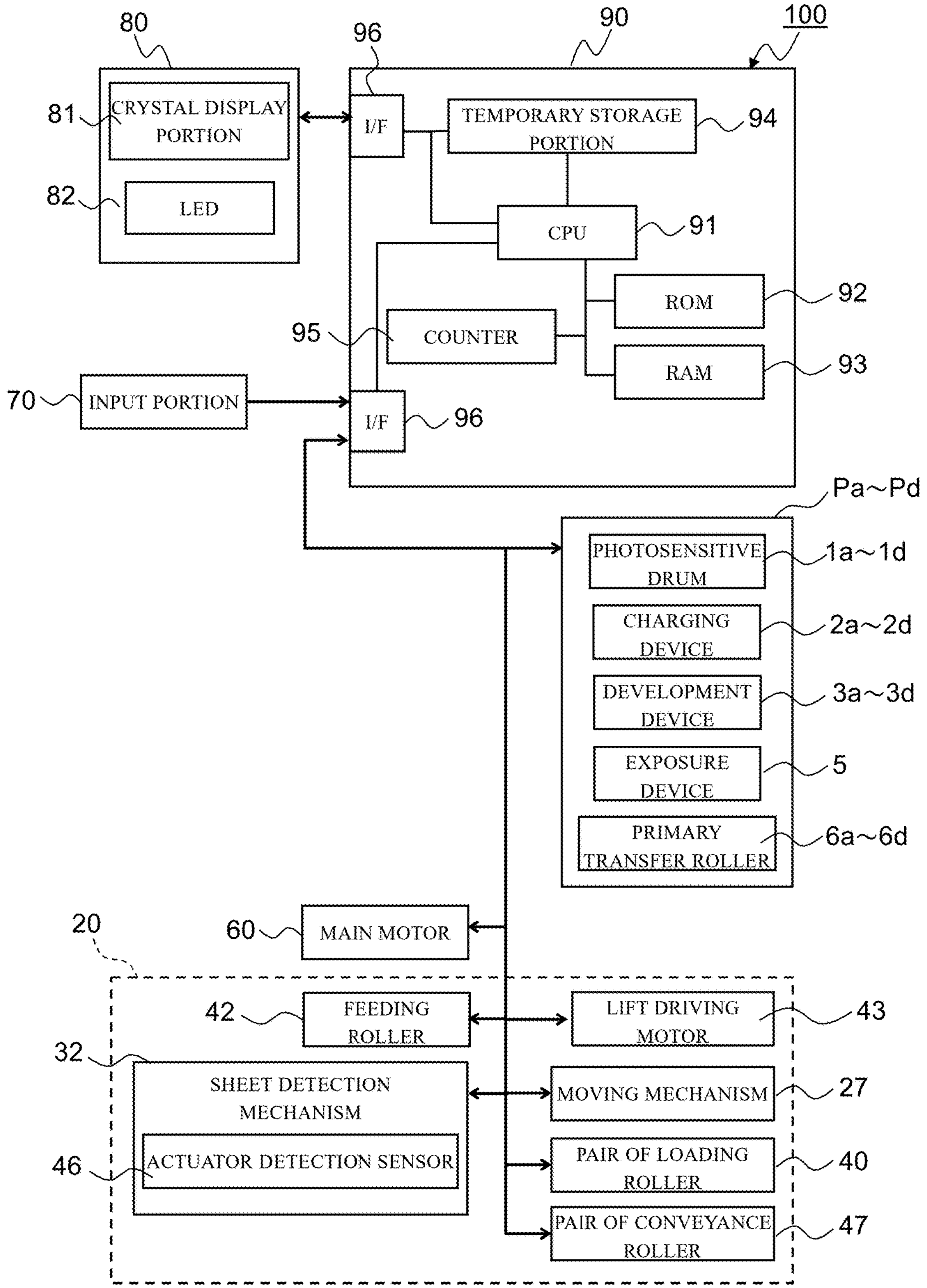
FIG. 7 is a block diagram showing an example of control paths in the image forming apparatus 100.

The lift plate 35 has a supporting portion 36, the stacking plate 37, and a lift driving motor 43 (see FIG. 7). The supporting portion 36 is swingably supported on the pair of first side wall portion 34*a*. The stacking plate 37 is a plate-form member on the top face of which sheets S1 can be stacked.

The stacking plate 37 is formed integrally with the supporting portion 36. As the supporting portion 36 swings, the stacking plate 37 moves up and down with respect to the bottom face part 33. The stacking plate 37 is located downstream (right side in FIG. 1) of the middle of the bottom face part 33 with respect to the sheet conveyance direction. As the stacking plate 37 moves up and down with respect to the bottom face part 33, the downstream end of the sheet S1 moves up and down.

As shown in FIGS. 2 and 3, in the stacking plate 37, a retraction recessed portion 44 is formed. The retraction recessed portion 44 is cut out from the downstream end of the stacking plate 37 upstream with respect to the sheet conveyance direction.

At the downstream end of the stacking plate 37 with respect to the sheet conveyance direction, a pressing portion 53 is provided. The pressing portion 53 has a lower elastic modulus than the stacking portion 37 and is formed of a material that is relatively easy to elastically deform. The lift driving motor 43 (see FIG. 7) is connected to the supporting portion 36. The lift driving motor 43 outputs a driving force to swing the supporting portion 36 and thereby moves the stacking plate 37 up and down.

Referring back to FIG. 1, in the side part of the apparatus main body 7, at a position above the opening in the cassette accommodation portion 29, a loading port 38 is formed. As shown in FIGS. 1 and 2, inside the apparatus main body 7, at a position between the cassette accommodation portion 29 and the intermediate transfer unit 31 with respect to the up-down direction, a bypass conveyance passage 39 is formed. A bottom part of the bypass conveyance passage 39 constitutes the top face of the cassette accommodation portion 29. The bypass conveyance passage 39 connects to the loading port 38 and extends from the loading port 38 to the sheet feeding portion 25. The downstream end of the bypass conveyance passage 39 in the sheet conveyance direction connects to the upstream end of the main conveyance passage 28 across the sheet feeding portion 25. Between the bypass conveyance passage 39 and the main conveyance passage 28 with respect to the sheet conveyance direction, an opening portion 41 is formed.

The MPF tray 26 is attached in the side part of the apparatus main body 7, at a position between the loading port 38 and the opening edge of the cassette accommodation portion 29 with respect to the up-down direction. The MPF tray 26 is a tray that inclines at a predetermined angle. The MPF tray 26 can have sheets S2 (sheets as a recording medium, such as printing sheets, envelopes, OHP sheets, and the like) stacked on its top face.

In the loading port 38, an MPF sheet detection sensor 58 and a pair of loading rollers 40 (second feeding portion) are provided. The MPF sheet detection sensor 58 is a sensor that can detect whether any sheet S2 is stacked on the MPF tray 26.

The pair of loading rollers 40 makes contact with the downstream end of the sheet S2 with respect to the sheet conveyance direction. As the pair of loading rollers 40 rotates, the sheet S2 is loaded into the bypass conveyance passage 39. The pair of loading rollers 40 can load the sheet S2 based on the result of detection by the MPF sheet detection sensor 58.

Along the bypass conveyance passage 39, a plurality of pairs of conveyance rollers 47 are arranged at a predetermined interval with respect to the sheet conveyance direction. The pairs of conveyance rollers 47 are each a pair of rollers facing each other in the up-down direction across the bypass conveyance passage 39. The pairs of conveyance rollers 47 are connected to a main motor 60 (a driving portion, see FIG. 7). The sheet S2 loaded into the bypass conveyance passage 39 is conveyed toward the sheet feeding portion 25 by the pairs of conveyance rollers 47.

The sheet feeding portion 25 is configured to include the opening portion 41 described above and a feeding roller 42. The space inside the cassette accommodation portion 29 communicates with the main conveyance passage 28 via the opening portion 41. The dimension of the opening portion 41 in the sheet width direction is larger than the dimension of the sheet S1 or S2 in the width direction. That is, the sheet S1 or S2 can pass through the opening portion 41 when it is open.

The feeding roller 42 is located at a position overlapping with the opening portion 41 with respect to the sheet conveyance direction. The feeding roller 42 is rotatably supported on the apparatus main body 7, is connected to the main motor 60 (see FIG. 7), and rotates with a rotative driving force from the main motor 60. The feeding roller 42 faces the pressing portion 53 with respect to the ascent-descent direction of the stacking plate 37.

The moving mechanism 27 is a mechanism configured to include a link mechanism, gears, and the like (of which none is illustrated), for moving the feeding roller 42 into pressed contact with or away from the pressing portion 53. The moving mechanism 27 is connected to the main motor 60 (see FIG. 7) and to a rotation shaft 45 of the feeding roller 42. The moving mechanism 27 moves the rotation shaft 45 in such a direction that the outer circumferential surface of the feeding roller 42 moves toward or away from the pressing portion 53.

As described above, the main motor 60 (see FIG. 7) is connected to the feeding roller 42 and to the pairs of conveyance rollers 47. To the main motor 60, the pair of loading rollers 40 and the pairs of conveyance rollers 47 are connected (see FIG. 7).

The main motor 60 can output a rotative driving force in both the forward and reverse directions. When the main motor 60 outputs a rotative driving force in the forward direction, the feeding roller 42 rotates and the pairs of conveyance rollers 47 and the pair of loading rollers 40 stops rotating. When the main motor 60 outputs a rotative driving force in the reverse direction, the feeding roller 42 stops rotating and the pairs of conveyance rollers 47 and the pair of loading rollers 40 rotate. Meanwhile, the feeding roller 42 retracts from the pressing portion 53 by the action of the moving mechanism 27. When the main motor 60 outputs a rotative driving force in the forward direction, the feeding roller 42 moves toward the pressing portion 53 by the action of the moving mechanism 27.

As shown in FIGS. 2 and 3, the sheet detection mechanism 32 has an actuator detection sensor 46 (detection sensor) and an actuator 48. The actuator detection sensor 46 is an optical sensor such as a photo interrupter having a detection portion 49. The detection portion 49 is composed of a light-receiving portion 50 and a light-emitting portion 51. The light-receiving portion 50 and the light-emitting portion 51 are arranged opposite each other in the sheet width direction. The actuator detection sensor 46 transmits to the control portion 90 the light-receiving state of the detection unit 49 (how the light beam emitted from the light-emitting portion 51 is being received by the light-receiving portion 50).

The actuator 48 is swingably supported on the apparatus main body 7. The actuator 48 has a swing shaft 54, a contact portion 55, an arm portion 56, and a light-shielding portion 57. The swing shaft 54 is rotatably supported on the apparatus main body 7. The contact portion 55 is located at a position upstream of the feeding roller 42 with respect to the sheet conveyance direction. The contact portion 55 connects to the swing shaft 54. The actuator 48 is provided outward of the feeding roller 42 (at the side farther from the middle of the stacking plate 37) with respect to the sheet width direction.

The arm portion 56 connects to the contact portion 55. The arm portion 56 is located downstream of the contact portion 55 with respect to the sheet conveyance direction. The arm portion 56 extends from the contact portion 55 along the radial direction of the swing shaft 54 toward the bottom face part 33. The arm portion 56 is located at a position overlapping with the retraction recessed portion 44 with respect to the sheet width direction. With respect to the sheet width direction, the thickness of the arm portion 56 is smaller than the width of the retraction recessed portion 44.

The light-shielding portion 57 connects to the swing shaft 54. The light-shielding portion 57 is located at the side of the swing shaft 54 opposite from the contact portion 55 with respect to the up-down direction. The light-shielding portion 57 is formed in a plate shape with a uniform thickness in the sheet width direction. The detection portion 49 is located inside the circle described by the light-shielding portion 57 with the swing shaft 54 as the center. The light-shielding portion 57 is located between the light-receiving portion 50 and the light-emitting portion 51 with respect to the sheet width direction.

The swing shaft 54, the contact portion 55, the arm portion 56, and the light-shielding portion 57 are formed integrally and swing integrally in the circumferential direction about the swing shaft 54 as the center. When the actuator 48 swings, the arm portion 56 moves into and out of the retraction recessed portion 44 and the contact portion 55 moves to and from between the light-receiving portion 50 and the light-emitting portion 51.

Figure 4:
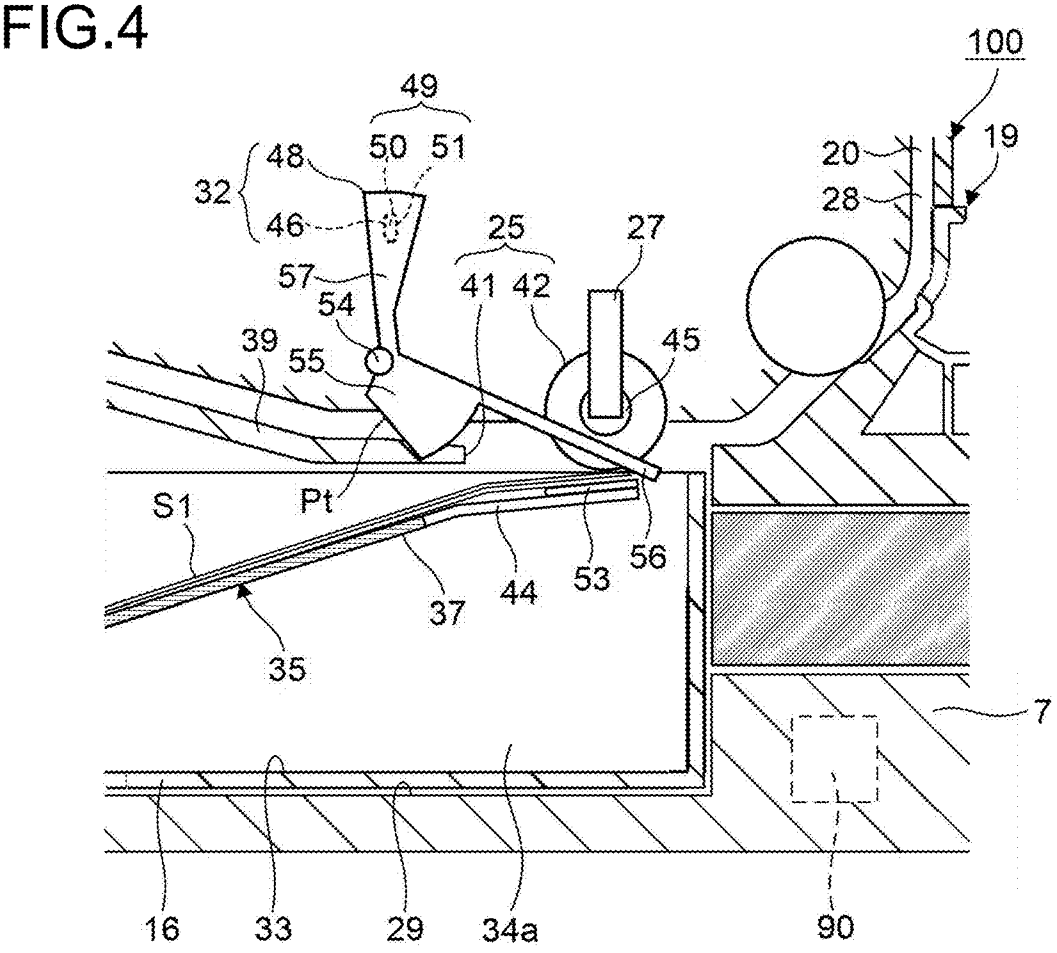
FIG. 4 is an enlarged side sectional view around a bottom part of the apparatus main body 7 with an actuator 48 at a detection position Pt.
Figure 5:
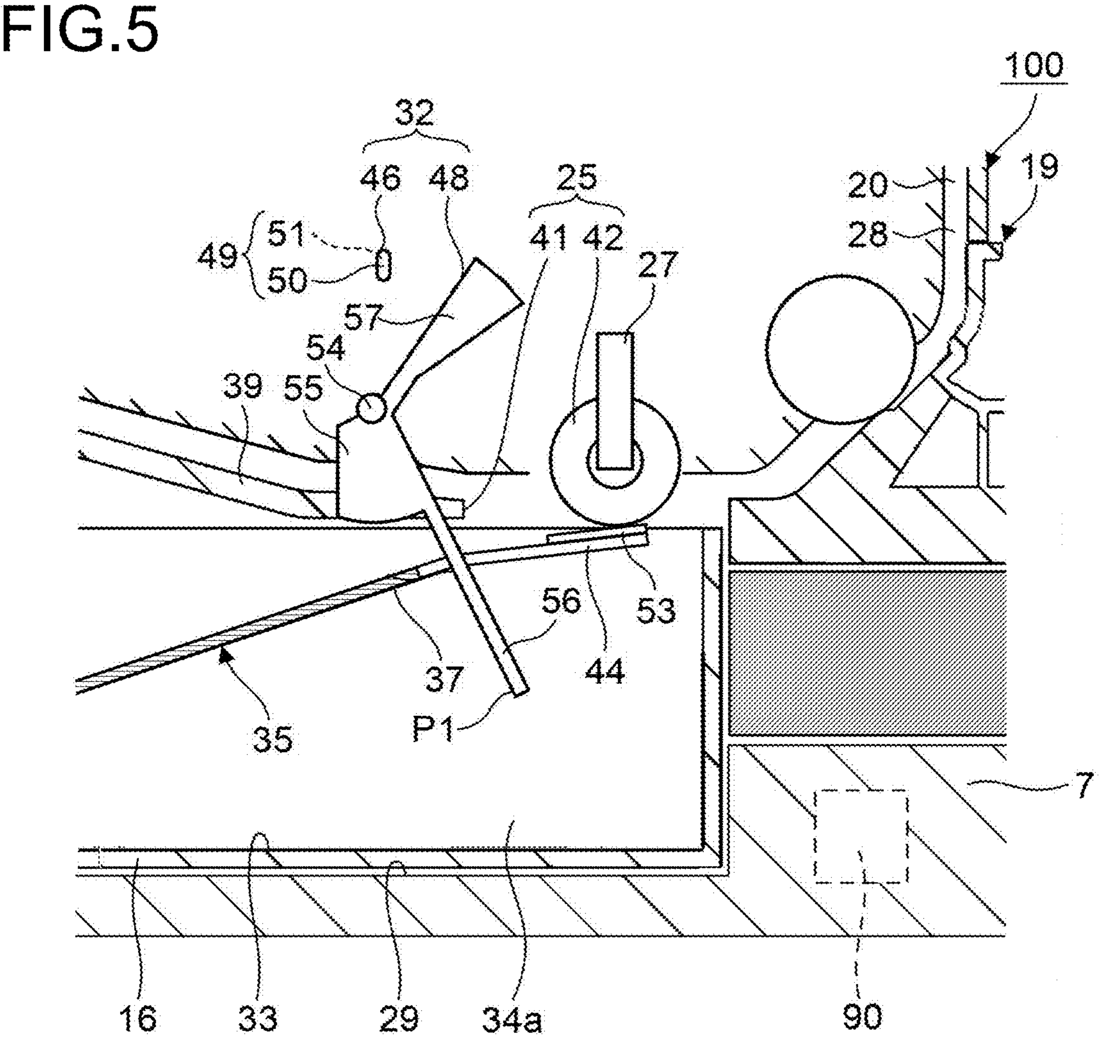
FIG. 5 is an enlarged side sectional view around a bottom part of the apparatus main body 7 in a state where, with the actuator 48 at a first position P1, the stacking plate 37 has risen and an arm portion 56 has entered a retraction recessed portion 44.
Figure 6:
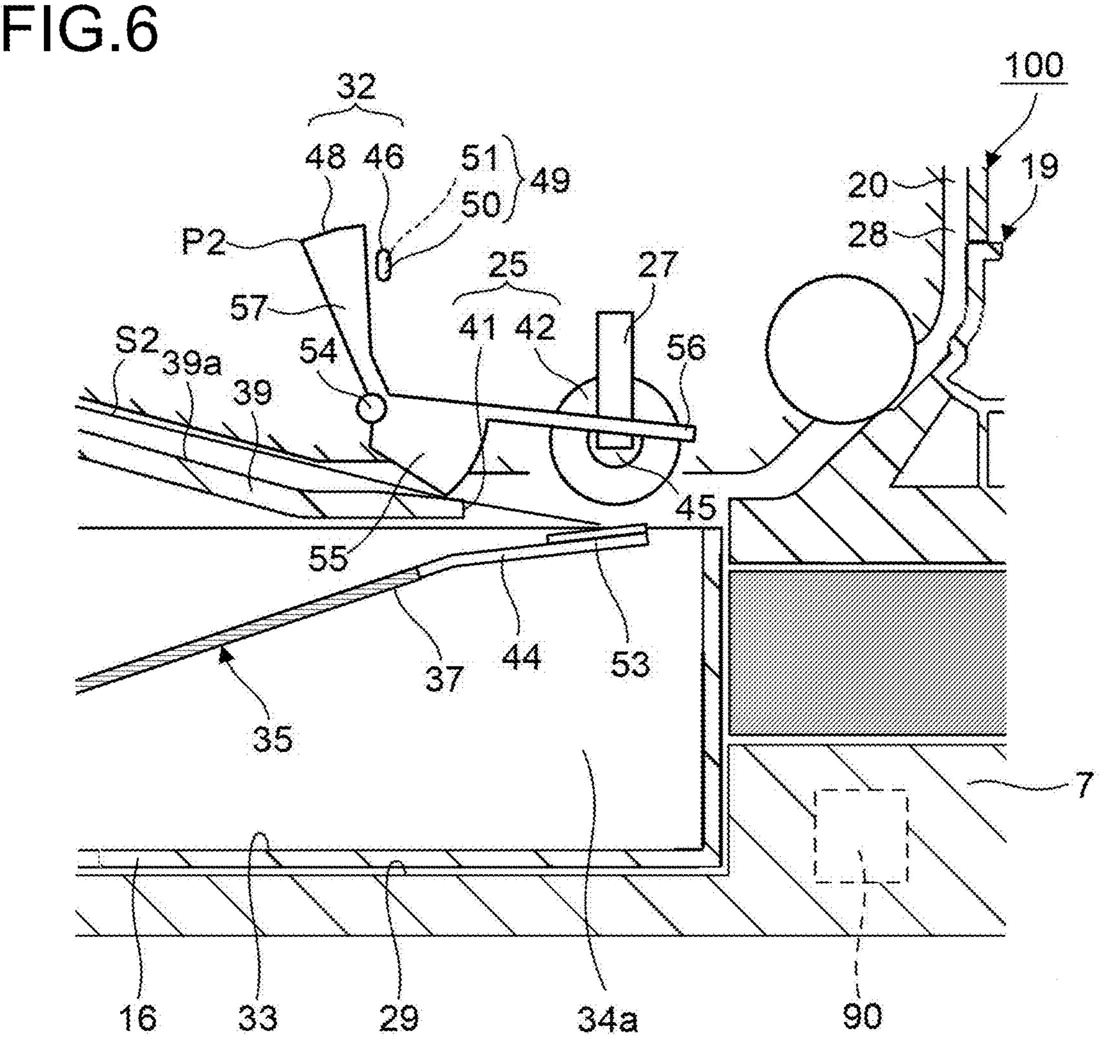
FIG. 6 is an enlarged side sectional view around a bottom part of the apparatus main body 7 with the actuator 48 at a second position P2.

Next, the swinging of the actuator 48 will be described in detail. FIG. 4 is an enlarged side sectional view around a bottom part of the apparatus main body 7 with the actuator 48 at a detection position Pt. FIG. 5 is an enlarged side sectional view around a bottom part of the apparatus main body 7 in a state where the stacking plate 37 has risen and the arm portion 56 has entered the retraction recessed portion 44 with the actuator 48 at a first position P1. FIG. 6 is an enlarged side sectional view around a bottom part of the apparatus main body 7 with the actuator 48 at a second position P2.

The swing direction of the actuator 48 (clockwise in FIG. 2) when it swings such that the arm portion 56 moves toward the bottom face part 33 is called the descent direction. The swing direction of the actuator 48 (counterclockwise in FIG. 2) when it swings such that the arm portion 56 moves away from the bottom face part 33 is called the ascent direction.

As shown in FIG. 2, the actuator 48 swings in the decent direction with its own weight in a state where the actuator 48 is not in contact with the sheet S2 and the stacking plate 37 has not risen. In this state, the arm portion 56 moves to below the lower end of the feeding roller 42. The position of the actuator 48 in this state is called the first position P1.

When the actuator 48 is at the first position P1, the light-shielding portion 57 is located upstream of the detection portion 49 with respect to the ascent direction. In this state, the light-shielding portion 57 opens between the light-receiving portion 50 and the light-emitting portion 51 and the detection portion 49 is in a light-transmitting state (a state where the light beam emitted from the light-emitting portion 51 is being received by the light-receiving portion 50).

When the stacking plate 37 rises in a state where the actuator 48 is at the first position P1 and sheets S1 are stacked on the bottom face part 33 (the state shown in FIG. 2), the arm portion 56 makes contact with the sheets S1 and is prevented from moving into the retraction recessed portion 44. As the stacking plate 37 rises, the arm portion 56 is pressed by the sheets S1 and the actuator 48 swings in the ascent direction.

When, as the stacking plate 37 rises, the actuator 48 swings in the ascent direction, the actuator 48 is detected by the actuator detection sensor 46 at a predetermined position. As the stacking plate 37 further rises, as shown in FIG. 4, the top face of the sheet S1 comes into pressed contact with the lower end of the feeding roller 42 and thus the stacking plate 37 stops rising. As a result, the actuator 48 also stops swinging. The position of the actuator 48 in this state is called a detection position Pt. The position of the sheet S1 in this state is also called a feeding position.

When the actuator 48 is at the detection position Pt, the light-shielding portion 57 is at a position overlapping with the detection portion 49 with respect to the swing direction of the actuator 48. In this state, the light-receiving portion 50 is shielded from light by the light-shielding portion 57 and thus the detection portion 49 is in a light-shielding state.

When the stacking plate 37 rises in a state where the actuator 48 is at the first position P1 and no sheets S1 are stacked on the bottom face part 33 (a state in which the sheets S1 have been removed from the state shown in FIG. 2), as shown in FIG. 5, the arm portion 56 moves into the retraction recessed portion 44. In this state, the arm portion 56 does not make contact with the stacking plate 37 and the actuator 48 remains at the first position P1 without swinging.

With the actuator 48 at the first position P1 or at the detection position Pt, when a sheet S2 is conveyed from the MPF tray 26, the sheet S2 makes contact with the contact portion 55. As a result of the sheet S2 in this state being conveyed downstream with respect to the sheet conveyance direction, the contact portion 55 is pressed by the sheet S2 downstream in the sheet conveyance direction. Then the actuator 48 swings in the ascent direction beyond the detection position Pt.

As shown in FIG. 6, when the actuator 48 swings in the ascent direction, the contact portion 55 moves upward, away from a conveyance face 39*a* of the bypass conveyance passage 39 (that is, of the inner circumferential faces of the bypass conveyance passage 39, the lower face facing the sheet S2). The sheet S2 is conveyed between the contact portion 55 and the conveyance face 39*a* to downstream of the actuator 48. Meanwhile, the sheet S2 is conveyed downstream while in sliding contact with the contact portion 55 and the actuator 48 is restrained from swinging in the decent direction by the sheet S2. The position of the actuator 48 in this state is called the second position P2.

When the actuator 48 is at the second position P2, the light-shielding portion 57 is located downstream of the detection portion 49 with respect to the ascent direction. In this state, the light-shielding portion 57 leaves open the space between the light-receiving portion 50 and the light-emitting portion 51 and the detection portion 49 is in a light-transmitting state.

The control portion 90, based on the state (a light-transmitting state or a light-shielding state) of the detection portion 49 of the actuator detection sensor 46, detects the actuator 48 swinging from the first position P1 to the detection position Pt or the second position P2. Hereinafter, the method of detecting the first position P1, the detection position Pt, and the second position P2 will be described in detail.

First, when from an input device such as a personal computer a command to start image formation (an image formation command), including a command to feed a sheet S2 from the MPF tray 26, is entered, the stacking plate 37 rises and the pressing portion 53 or a sheet S1 stacked on the pressing portion 53 comes into pressed contact with the feeding roller 42.

In this state, if sheets S1 are stacked on the stacking plate 37, the detection portion 49 is in the light-shielding state as described above and, based on the result of detection by the actuator detection sensor 46, the control portion 90 detects the position of the actuator 48 as the detection position Pt (see FIG. 4).

By contrast, if no sheets S1 are stacked on the stacking plate 37, even if the stacking plate 37 rises, the detection portion 49 remains in the light-transmitting state (see FIG. 5). When the duration (a light-transmitting time T1) of the light-transmitting state is longer than or equal to a predetermined duration (a reference light-transmitting time T2), based on the result of detection by the actuator detection sensor 46, the control portion 90 detects the position of the actuator 48 as the first position P1. In this state, an indication portion (an operation portion 80, which will be described later) of the image forming apparatus 100 is notified that no sheets S1 are stacked on the sheet cassette 16.

If the input image formation command mentioned above is a command to feed a sheet S1, the control portion 90 raises the stacking plate 37 and, when the actuator detection sensor 46 detects the detection position Pt, makes the main motor 60 output a rotative driving force in the forward direction. Then the feeding roller 42 rotates and the sheet S1 in pressed contact with the feeding roller 42 is fed to the main conveyance passage 28.

By contrast, if the input image formation command mentioned above is a command to feed a sheet S2, the control portion 90 raises the stacking plate 37 to a sheet feed position and makes the main motor 60 output a rotative driving force in the reverse direction. Thus, the feeding roller 42 moves away from the pressing portion 53 or the sheet S1 by the action of the moving mechanism 27 and the pair of loading rollers 40 and the pairs of conveyance rollers 47 rotate to feed the sheet S2 to the bypass conveyance passage 39.

When the sheet S2 is conveyed to downstream of the bypass conveyance passage 39 and makes contact with the contact portion 55, the actuator 48 swings in the ascent direction. Here, if, with the actuator 48 at the detection position Pt, the sheet S2 is fed by the pair of loading rollers 40 to the bypass conveyance passage 39, the detection portion 49 changes from the light-shielding state to the light-transmitting state. By contrast, if, with the actuator 48 at the first position P1, the sheet S2 is fed to the bypass conveyance passage 39, the actuator 48 moves from the first position P1 to the second position P2 beyond the detection position Pt. Thus, the detection portion 49 changes from the light-transmitting state temporarily to the light-shielding state and then back to the light-transmitting state.

The control portion 90, on detecting the detection portion 49 having changed from the light-shielding state to the light-transmitting state, detects the position of the actuator 48 as the second position P2. The control portion 90, if a command to feed a sheet S2 is entered, does not detect whether any sheet S1 is stacked on the sheet cassette 16.

The control portion 90, if the actuator detection sensor 46 detects the second position P2, temporarily stops the main motor 60, that is, stops the conveyance by the pairs of conveyance rollers 47. Then, as shown in FIG. 6, the leading end of the sheet S2 (its downstream end in the sheet conveyance direction) is arranged between the feeding roller 42 and the pressing portion 53. To convey the sheet S2 downstream, the control portion 90 makes the main motor 60 output a rotative driving force in the forward direction and, with the feeding roller 42 in pressed contact with the sheet S2, rotates the feeding roller 42 by the action of the moving mechanism 27. As the feeding roller 42 rotates, the sheet S2 is conveyed downstream.

If the trailing end of the sheet S2 (its upstream end in the sheet conveyance direction) moves away from the contact portion 55, the actuator 48 swings in the decent direction and moves back to the detection position Pt or to the first position P1. If the actuator 48 moves from the second position P2 to the detection position Pt, after the detection portion 49 changed from the light-transmitting state to the light-shielding state, the light-shielding state continues. By contrast, if the actuator 48 moves from the second position P2 to the first position P1, the detection portion 49 changes from the light-transmitting state temporarily to the light-shielding state and then back to the light-transmitting state.

In either case, the control portion 90 judges that the actuator 48 is arranged at the detection position Pt at this timing of the actuator detection sensor 46 detecting the actuator 48 (that is, the detection portion 49 changing from the light-transmitting state to the light-shielding state) during the feeding of the sheet S2.

After that, if the detection portion 49 detects a change from the light-shielding state back to the light-transmitting state within a predetermined time, the control portion 90 detects the actuator 48 having moved to the first position P1. In this case, when the sheet S2 is fed by the pair of loading rollers 40, the control portion 90 can judge that the actuator 48 is arranged at the first position P1.

If the light-shielding state of the detection portion 49 continues, the control portion 90 detects the actuator 48 being arranged at the detection position Pt. In this case, when the sheet S2 is fed by the pair of loading rollers 40, the control portion 90 can judge that the actuator 48 is arranged at the detection position Pt.

FIG. 7 is a block diagram showing an example of control paths in the image forming apparatus 100. As shown in FIG. 7, the control paths in the image forming apparatus 100 are configured to include an input portion 70, an operation portion 80, the control portion 90, and the image forming portions Pa to Pd.

The input portion 70 is a receiving portion that receives image data transmitted from a personal computer and the like to the image forming apparatus 100. An image signal fed to the image input portion 70 is converted into a digital signal, and is then fed to the temporary storage portion 94. The input portion 70 is included in the configuration of the sheet conveyance device 19.

The operation portion 80 includes a liquid crystal display portion 81 and LEDs 82 that indicate various states, and indicates the status of the image forming apparatus 100, the progress of image formation, and the number of copies printed. From the operation portion 80, the type and size of the sheet S1 or S2 can be entered. The various settings for the image forming apparatus 100 are made from a printer driver on the personal computer.

The control portion includes a CPU (central processing unit) 91, a ROM (read-only memory) 92, a RAM (random-access memory) 93, a temporary storage portion 94, a counter 95, and a plurality of (here, two) I/Fs (interfaces) 96. The CPU 91 functions as a central arithmetic processor. The temporary storage portion 94 temporarily stores various kinds of information such as image data. The I/Fs 96 transmit control signals to different blocks in the image forming apparatus 100 and receive input signals from the operation portion 80.

The ROM 92 is a read-only storage portion. The RAM 93 is a readable and rewritable storage portion. The ROM 92 stores a control program for the image forming apparatus 100 as well as data that are not changed during the use of the image forming apparatus 100, such as values necessary for control. The reference light-transmitting time T2 described above is stored in the ROM 92.

The temporary storage portion 94 temporarily stores the image signal fed the image input portion 70 and converted into a digital signal. The position of the actuator 48 (the detection position Pt or the first position P1) is stored in the temporary storage portion 94.

The counter 95 counts the number of sheets S1 or S2 fed and a predetermined time. For example, the counter 95 counts the light-transmitting time T1 described above. A value counted by the counter 95 can be stored in the temporary storage portion 94 or the RAM 93.

Figure 8:
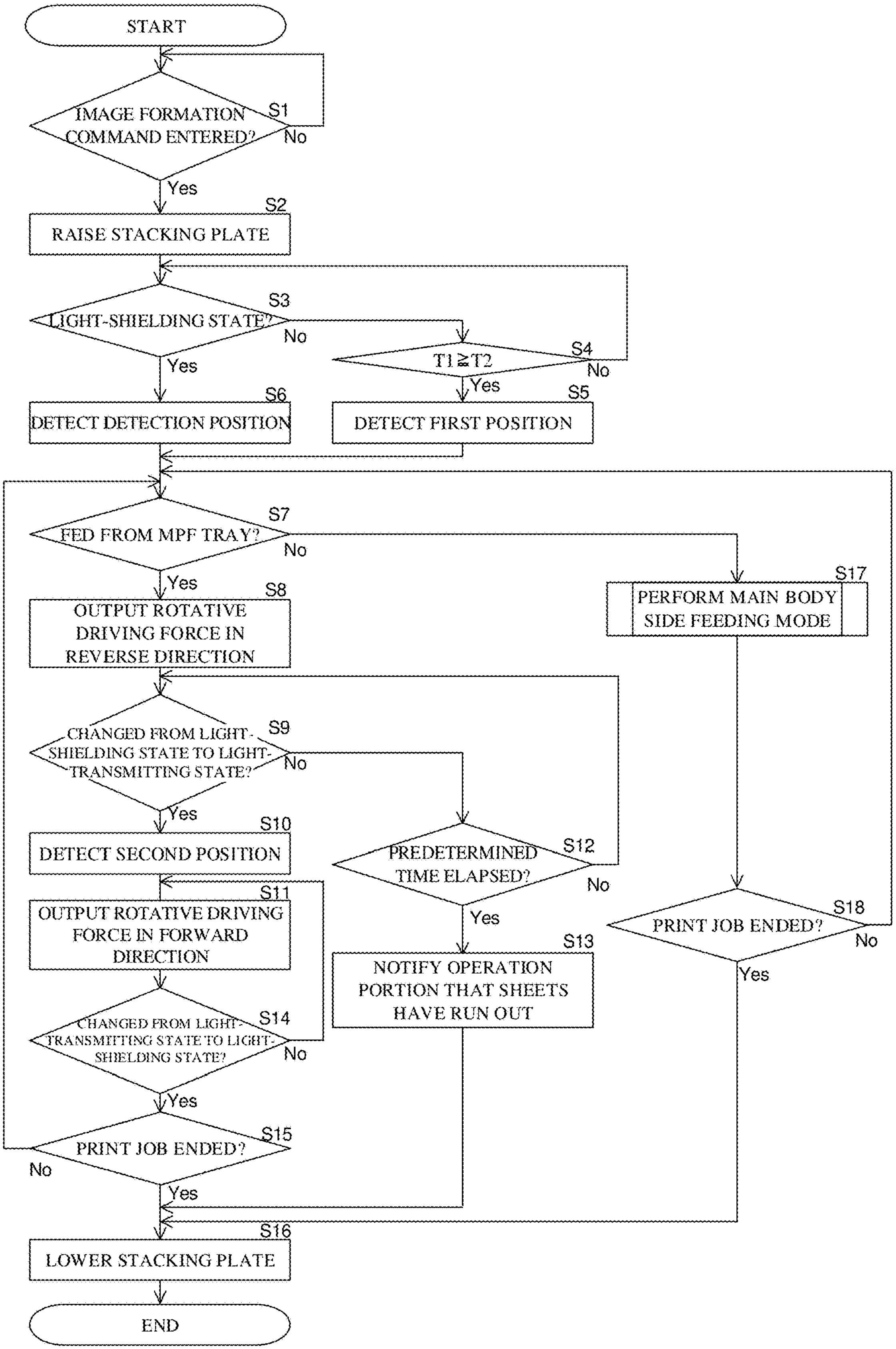
FIG. 8 is a flow chart showing an example of a control flow for the sheet conveyance device 19.

Next, an example of control in the sheet conveyance device 19 of the embodiment will be described with reference to a flow chart shown in FIG. 8. FIG. 8 is a flow chart showing an example of a control flow for the sheet conveyance device 19.

As shown in FIG. 8, the control portion 90 judges whether an image formation command is entered from a host device such as a personal computer (step S1). So long as no image formation command is entered (No in step S1), the standby state is continued until an image formation command is entered.

If an image formation command is entered (Yes in step S1), the lift driving motor 43 is driven to raise the stacking plate 37 (step S2). Then, whether the detection portion 49 is in the light-shielding state is checked (step S3).

If the detection portion 49 is not in the light-shielding state (No in step S3), whether the light-transmitting time T1 is longer than or equal to the reference light-transmitting time T2 is checked (step S4). If the light-transmitting time T1 is longer than or equal to the reference light-transmitting time T2 (Yes in step S4), it is judged that the actuator 48 is at the first position P1 (step S5) and an advance is made to step S7, which will be described later. If the light-transmitting time T1 has not reached the reference light-transmitting time T2 (No in step S4), a return is made to step S3.

If in step S3 the detection portion 49 is in the light-shielding state (Yes in step S3), it is judged that the actuator 48 is at the detection position Pt (step S6). Next, based on the input image formation command, whether to feed a sheet S2 from the MPF tray 26 is determined (step S7).

If a sheet S2 is fed from the MPF tray 26 (Yes in step S7), the main motor 60 outputs a rotative driving force in the reverse direction (step S8). The steps that follows if a sheet S1 is fed from the sheet cassette 16 (No in step S7) will be described later.

After step S8, whether the detection portion 49 has changed from the light-shielding state to the light-transmitting state is checked (step S9). If the detection portion 49 has changed from the light-shielding state to the light-transmitting state (Yes in step S9), it is judged that the actuator 48 is at the second position P2 (step S10). Then the main motor 60 outputs a rotative driving force in the forward direction (step S11).

If the detection portion 49 has not changed from the light-shielding state to the light-transmitting state (No in step S9), whether a predetermined time has elapsed is checked (step S12). The predetermined time is the time after the sheet S2 is fed from the MPF tray 26 until it reaches the sheet feeding portion 25, and is stored in advance in the ROM 92. If the predetermined time has not elapsed (No in step S12), a return is made to step S9. If the predetermined time has elapsed (Yes in step S12), the operation portion 80 is notified that no sheets S2 are stacked on the MPF tray 26 (sheets have run out) (step S13), the stacking plate 37 (step S16) is lowered, and then the control of the sheet conveyance device 19 is ended.

After step S11, whether the detection portion 49 has changed to the light-shielding state is checked (step S14). If it has not changed (No in step S14), until the detection portion 49 changes to the light-shielding portion, the main motor 60 continues to output a rotative driving force in the forward direction.

If in step S14 the detection portion 49 changes to the light-shielding state (Yes in step S14), whether a print job has ended is checked (step S15). If the print job has not ended (No in step S15), a return is made to step S7. If the print job has ended (Yes in step S15), the stacking plate 37 (step S16) is lowered and then the control of the sheet conveyance device 19 is ended.

If in step S7 described above it is judged that no sheet S2 is fed from the MPF tray 26 (No in step S7), a main body side feeding mode that feeds sheets S1 from the sheet cassette 16 is performed (step S17). The main body side feeding mode will be described later.

After the main body side feeding mode is performed, whether the print job has ended is checked (step S18). If it has ended, an advance is made to step S16 described above and, if the print job has not ended (No in step S18), a return is made to step S7.

Figure 9:
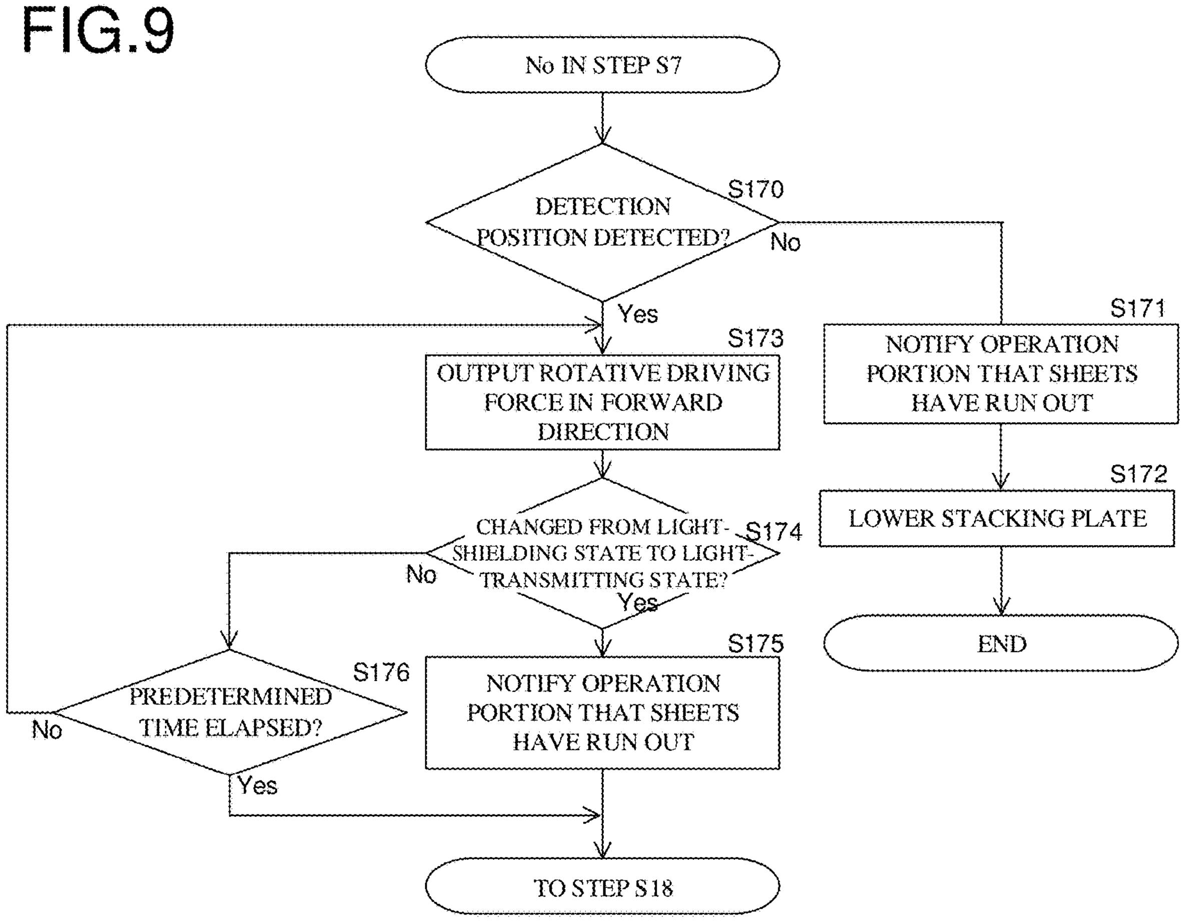
FIG. 9 is a flow chart showing a control flow in a main body side feeding mode.

Next, the main body side feeding mode will be described with reference to FIG. 9. FIG. 9 is a flow chart showing a control flow in the main body side feeding mode. As shown in FIG. 9, if in step S7 no sheet S2 is fed from the MPF tray 26 (No instep S7, see FIG. 8), whether the detection position Pt is detected is checked (step S170). If it is judged that the detection position Pt is not detected (No in step S170), the operation portion 80 is notified that no sheets S1 are stacked on the sheet cassette 16 (sheets have run out) (step S171), the stacking plate 37 (step S172) is lowered, and then the control of the sheet conveyance device 19 is ended.

If in step S170 the detection position Pt is detected (Yes in step S170), the main motor 60 outputs a rotative driving force in the forward direction (step S173).

Next, whether the detection portion 49 has changed from the light-shielding state to the light-transmitting state is checked (step S174). If it has changed from the light-shielding state to the light-transmitting state (Yes in step S174), the operation portion 80 is notified that no sheets S1 are left in the sheet cassette 16 (sheets have run out) (step S175), the main body side feeding mode is ended and an advance is made to step S18 (see FIG. 8).

If in step S174 it is judged that the detection portion 49 is not changed from the light-shielding state to the light-transmitting state (No in step S174), whether a predetermined time has elapsed is checked (step S176). The predetermined time is the time until the trailing end of the sheet S1 moves away from the feeding roller 42. If the predetermined time has not elapsed (No in step S176), a return is made to step S173 and, if the predetermined time has elapsed (Yes in step S176), the main body side feeding mode is ended and an advance is made to step S18 (see FIG. 8).

As described above, by detecting the swinging of the actuator 48 with the actuator detection sensor 46, it is possible to check whether sheets S1 are stacked on the sheet cassette 16 and whether a sheet is conveyed from the MPF tray 26. It is thus possible to reduce the number of sensors and to provide, while suppressing an increase in the manufacturing cost, a sheet conveyance device that can detect a sheet fed from the MPF tray 26.

If the input image formation command is one requesting feeding a sheet S2 from the MPF tray 26, no change occurs in the remaining number of sheets S1 stacked on the sheet cassette 16. Thus, in this case, if the detection portion 49 has changed from the light-shielding state to the light-transmitting state, it always means that the actuator 48 has moved to the second position P2 beyond the detection position Pt.

Thus, as described above, if the input image formation command is judged to be one requesting feeding a sheet S2 from the MPF tray 26, then by letting the actuator detection sensor 46 first detect the detection position Pt or the first position P1 and then detect a change from the light-shielding state to the light-transmitting state, it is possible to detect the actuator 48 being located at the second position P2. This helps give the control system for judging the detection of the second position P2 a relatively simple configuration. It is thus possible to more suitably suppress an increase in the manufacturing cost of the sheet conveyance device 19.

As described above, with the sheet detection mechanism 32, whether a sheet S2 fed from the MPF tray 26 has made contact with the contact portion 55 can be detected. Thus, until the sheet S2 reaches the sheet feeding portion 25, the feeding roller 42 can be kept retracted from the pressing portion 53 and, when the sheet S2 reaches the sheet feeding portion 25, the feeding roller 42 can be brought into pressed contact with the sheet S2.

With this configuration, when the sheet S2 is fed from the MPF tray 26, the feeding roller 42 moves away from the sheet S1 and the sheet S1 can be prevented from being fed from the sheet cassette 16. When the sheet S2 fed from the MPF tray 26 reaches the sheet conveyance portion 25, the feeding roller 42 can feed out the sheet S2 to the main conveyance passage 28 so there is no need to additionally provide another roller for conveying the sheet S2 to the main conveyance passage 28. It is thus possible to simplify the configuration and to suppress an increase in the manufacturing cost of the sheet conveyance device 19.

The present invention is not limited to the above embodiments and can be carried out with any modifications made without departure from the spirit of the preset invention. For example, the actuator detection sensor 46 can, based on the light-transmitting time T1 and the light-shielding time T3 (duration of a state where the detection portion 49 is shielded from light) of the detection portion 49, detect the detection position Pt, the second position P2, and the first position P1. In this case, reference times corresponding to the detection of the detection position Pt, the second position P2, and the first position P1 are stored in advance in the ROM 92 and comparing with those reference times achieves judgment of the position of the actuator 48.

The present invention is applicable not only to a tandem-type color printer like the one shown in FIG. 1 but also to various types of intermediate transfer type image forming apparatuses in which in image forming portions is arranged above an intermediate transfer belt.

Such a sheet conveyance device 19 can be incorporated not only in image forming apparatuses but also in the main body of an apparatus including at least two sheet stacking portions from which sheets are fed (for example, a large-capacity sheet storage apparatus that is arranged upstream of an image forming apparatus and that can feed sheets to the image forming apparatus).

INDUSTRIAL APPLICABILITY

The present invention finds applications in apparatuses (such as image forming apparatuses and sheet storage devices) including at least two sheet stacking portions from which sheets are fed. Based on the present invention, it is possible to provide, while suppressing an increase in the manufacturing cost, a sheet conveyance device that can detect whether sheets are stacked on one of the sheet stacking portions and whether a sheet is conveyed from the other sheet stacking portion.

The invention claimed is:

1. A sheet conveyance device comprising:

a sheet conveyance passage provided in an apparatus main body to convey a sheet;

a first sheet stacking portion arranged inside the apparatus main body, the first sheet stacking portion including:

a bottom face part on which the sheet is stacked; and a lifting plate provided so as to be movable up and down with respect to the bottom face part, the lifting plate moving the sheet on the bottom face part up and down to arrange the sheet at a feeding position, a first feeding portion that feeds the sheet stacked on the first sheet stacking portion to the sheet conveyance passage;

a second feeding portion that feeds the sheet fed from a loading port provided in a side part of the apparatus main body to the first feeding portion;

a bypass conveyance passage that extends from the second feeding portion to the first feeding portion, the bypass conveyance passage conveying the sheet fed from the second feeding portion to the first feeding portion;

a sheet detection mechanism provided in the first feeding portion, the sheet detection mechanism being able to detect whether the sheet is stacked on the first sheet stacking portion;

a driving portion that can switch a rotation direction thereof, the driving portion, when rotating in a forward direction, driving the first feeding portion and, when rotating in a reverse direction, driving the second feeding portion; and a control portion that controls conveyance of the sheet, wherein the sheet detection mechanism has:

an actuator that can swing along a sheet conveyance direction while in contact with the sheet stacked on the first sheet stacking portion and arranged at the feeding position by the lifting plate or the sheet conveyed by the second feeding portion through the bypass conveyance passage to the first feeding portion; and a detection sensor that detects the actuator at a predetermined detection position, and the control portion controls such that, when the sheet is fed from the first sheet stacking portion, the lifting plate moves the sheet stacked on the first sheet stacking portion to the feeding position and, when the sheet is detected by the sheet detection mechanism, the driving portion rotates in the forward direction so that the first feeding portion feeds the sheet, and when the sheet is conveyed from the second feeding portion, the driving portion rotates in the reverse direction so that the sheet is conveyed to the first feeding portion by the second feeding portion and, when the detection sensor detects at the detection position the actuator swinging by making contact with the sheet conveyed from the second feeding portion, the driving portion is switched to rotate in the forward direction so that the first feeding portion feeds the sheet.

2. The sheet conveyance device according to claim 1, wherein in a state where the lifting plate has not risen, the actuator is arranged at a first position, when, in a state where the sheet is stacked on the first sheet stacking portion, the lifting plate rises until a top face of the sheet is arranged at the feeding position, the actuator comes into contact with the top face of the sheet at the feeding position and swings from the first position to the detection position, on making contact with the sheet conveyed from the second feeding portion, the actuator is pressed by the sheet and swings from the first position to the detection position and then swings to the second position beyond the detection position, and when the detection sensor detects the actuator swinging from the detection position to the second position, the control portion makes the driving portion switch to rotate in the forward direction so that the first feeding portion starts to convey the sheet.

3. The sheet conveyance device according to claim 2, wherein the detection sensor is an optical sensor including a detection portion having a light-emitting portion and a light-receiving portion, the actuator has a contact portion that makes contact with the sheet and a light-shielding portion that shields or opens an optical path between the light-emitting portion and the light-receiving portion, and the detection sensor, based on whether the light-shielding portion is shielding or transmitting light to the detection portion, detects the actuator swinging from the first position to the detection position or to the second position.

4. The sheet conveyance device according to claim 3, wherein when the sheet is fed from the first sheet stacking portion, the control portion raises the lifting plate to the feeding position and, when the detection sensor changes from a light-transmitting state to a light-shielding state, the control portion detects the sheet being stacked on the first sheet stacking portion.

5. The sheet conveyance device according to claim 3, wherein the contact portion has a first contact portion that makes contact with the sheet stacked on the first sheet stacking portion and a second contact portion that bulges from a base end part of the first feeding portion toward the second feeding portion in the sheet conveyance direction, the second contact portion making contact with the sheet conveyed from the second feeding portion.

6. The sheet conveyance device according to claim 2, wherein the first feeding portion has:

a pickup roller that feeds the sheet downstream in the sheet conveyance direction while in pressed contact with the sheet; and a moving mechanism that, when the driving portion rotates in the forward direction, brings the pickup roller into pressed contact with the top face of the sheet arranged at the feeding position or with the lifting plate and, when the driving portion rotates in the reverse direction, moves the pickup roller away from the top face of the sheet arranged at the feeding position or from the lifting plate, and when the sheet is fed from the second feeding portion, the control portion raises the lifting plate to arrange the sheet at the feeding position, the control portion then making the driving portion rotate in the reverse direction so that, by the action of the moving mechanism, the pickup roller retracts to above the top face of the sheet arranged at the feeding position or above the lifting plate, the control portion then conveying the sheet from the second feeding portion to above the lifting plate, the control portion then making, in a state where the actuator is at the second position, the driving portion rotate in the forward direction so that, by the action of the moving mechanism, the pickup roller comes into pressed contact with the lifting plate or the sheet on the lifting plate and rotates while in pressed contact with the sheet to convey the sheet to the conveyance passage.

7. The sheet conveyance device according to claim 1, wherein the lifting plate has formed therein, at a position overlapping with the actuator with respect to a sheet width direction orthogonal to the sheet conveyance direction, a retraction recessed portion into which the actuator can move, and when no sheet is stacked on the first sheet stacking portion, the actuator moves into the retraction recessed portion and, regardless of an ascent-descent position of the lifting plate, the actuator is arranged at the first position.

8. The sheet conveyance device according to claim 1, further comprising:

an input portion that accepts input of a selection between feeding of the sheet from the first sheet stacking portion and feeding of the sheet from the second feeding portion.

9. An image forming apparatus comprising:

an image forming portion that forms an image on the sheet, and the sheet conveyance device according to claim 1 that conveys the sheet to the image forming portion.

* * * * *